United States Patent
Sanjuan et al.

(10) Patent No.: US 10,340,764 B2
(45) Date of Patent: Jul. 2, 2019

(54) RETIGHTENABLE WEDGE SYSTEM FOR TIGHTENING COIL IN SLOT OF GENERATOR STATOR

(71) Applicant: SIEMENS ENERGY, INC., Orlando, FL (US)

(72) Inventors: Xabier A. Sanjuan, Orlando, FL (US); Michael R. Vindler, Pittsburgh, PA (US); Michael A. Hall, Greensburg, PA (US); Timothy J. Garner, Winter Springs, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 247 days.

(21) Appl. No.: 15/474,324

(22) Filed: Mar. 30, 2017

(65) Prior Publication Data

US 2018/0287448 A1     Oct. 4, 2018

(51) Int. Cl.
| | |
|---|---|
| *H02K 3/48* | (2006.01) |
| *H02K 3/487* | (2006.01) |
| *H02K 1/18* | (2006.01) |
| *H02K 15/00* | (2006.01) |

(52) U.S. Cl.
CPC .............. *H02K 3/487* (2013.01); *H02K 1/18* (2013.01); *H02K 15/0018* (2013.01)

(58) Field of Classification Search
USPC .................................................. 310/214, 215
See application file for complete search history.

(56) References Cited

U.S. PATENT DOCUMENTS

| | | | |
|---|---|---|---|
| 6,252,328 B1 | 6/2001 | Brown | |
| 2006/0283234 A1* | 12/2006 | Fischer | H02K 15/00 73/12.09 |
| 2008/0036336 A1* | 2/2008 | Salem | H02K 11/20 310/68 B |

FOREIGN PATENT DOCUMENTS

| | | | | |
|---|---|---|---|---|
| DE | 1638274 A1 | 7/1971 | | |
| DE | 3533748 A1 | 4/1986 | | |
| DE | 19818150 A1 | 10/1999 | | |
| EP | 2187504 A1 * | 5/2010 | ............. | H02K 3/487 |
| EP | 2894769 A1 * | 7/2015 | ............. | H02K 3/487 |
| EP | 2894769 A1 | 7/2015 | | |
| WO | WO-03044926 A2 * | 5/2003 | ............. | H02K 3/487 |

* cited by examiner

*Primary Examiner* — Naishadh N Desai

(57) ABSTRACT

A retightenable wedge system for tightening a coil in a slot of a generator stator bar is presented. The retightenable wedge system includes a first filler layer, a spring member, a second filler layer and a retightenable wedge assembly. The retightenable wedge assembly includes a slot wedge having an aperture, a tightening member having form fit feature and a locking member having mating form fit feature. The tightening member is tightenable in the aperture such that a radial load is applied on the second filler layer for tightening the coil in the slot. The tightening member is locked in place in the aperture by an engagement between the form fit feature of the tightening member and the mating form fit feature of the locking member such that the tightening member is restrained from backing out of the slot wedge.

9 Claims, 4 Drawing Sheets

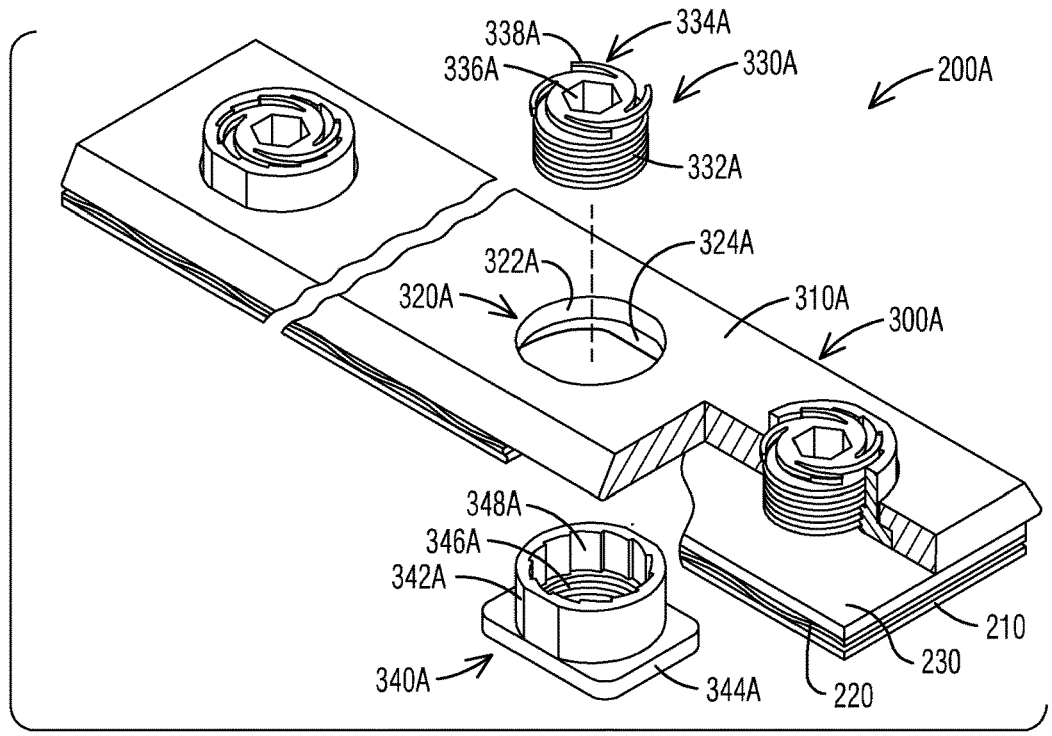
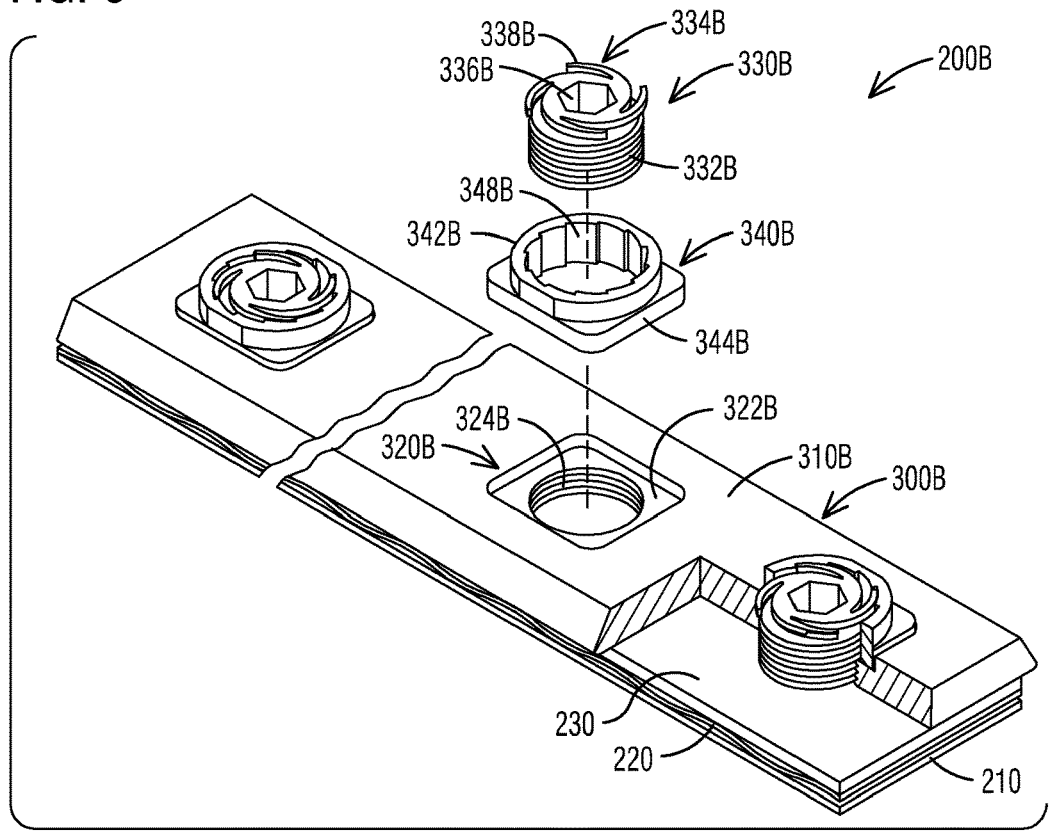

US 10,340,764 B2

RETIGHTENABLE WEDGE SYSTEM FOR TIGHTENING COIL IN SLOT OF GENERATOR STATOR

TECHNICAL FIELD

The present invention relates generally to a retightenable wedge system for tightening a coil in a slot of a generator stator.

DESCRIPTION OF RELATED ART

A generator is a component in power generation industry that converts mechanical power to electrical power. A generator typically includes a stator and a rotor. A generator stator may employ a stator core comprised a plurality of axially extending slots along an internal circumference of the core. At least one coil is placed within each of the stator slots. During generator operation, the coil in the slot may tend to move within the slot. Such movement of the coil within the slot may damage the generator stator. A wedge system may be placed on the coil to prevent movement of the coil within the slot.

The wedge system may become loose over time in generator operation, which may decrease life of the stator due to wear caused by excessive vibration. Periodic tightness inspection of the wedge system may be required either during maintenance or at power plant outages. A full or partial re-wedging may be recommended after tightness inspection. The full or partial re-wedge may require removal of the generator rotor and is a time and material consumptive process, which may be costly to perform.

SUMMARY OF INVENTION

Briefly described, aspects of the present invention relate to a retightenable wedge system and a method for tightening a coil in a slot of a generator stator.

According to an aspect, a retightenable wedge system for tightening a coil in a slot of a generator stator is presented. The retightenable wedge system comprises a first filler layer placed on the coil, a spring member placed on the first filler layer, a second filler layer placed on the spring member, and a retightenable wedge assembly placed on the second filler layer. The retightenable wedge assembly comprises a slot wedge comprising an aperture. The retightenable wedge assembly comprises a tightening member comprising a form fit feature. The tightening member is configured to be tightenable in the aperture for applying a radial load on the second filler layer. The second filler layer is configured to evenly distribute the radial load on the spring member. The spring member is configured to apply the evenly distributed radial load onto the coil for tightening the coil in the slot. The retightenable wedge assembly comprises a locking member comprising a mating form fit feature configured to engage with the form fit feature of the tightening member to lock the tightening member in place in the aperture such that the tightening member is able to be restrained from backing out of the slot wedge.

According to an aspect, a method for tightening a coil in a slot of a generator stator is presented. The method comprises placing a first filler layer on the coil, placing a spring member on the first filler layer, placing a second filler layer on the spring member, and placing a retightenable wedge assembly on the second filler layer. The retightenable wedge assembly comprises a slot wedge comprising an aperture, a tightening member comprising a form fit feature, and a locking member comprising a mating form fit feature. The method comprises tightening the tightening member in the aperture for applying a radial load on the second filler layer. The second filler layer is configured to evenly distribute the radial load on the spring member. The spring member is configured to apply the evenly distributed radial load onto the coil for tightening the coil in the slot. The method comprises locking the tightening member in place in the aperture by an engagement between the form fit feature of the tightening member and the mating form fit feature of the locking member such that the tightening member is able to be restrained from backing out of the slot wedge.

According to an aspect, a retightenable wedge assembly for tightening a coil in a slot of a generator stator is presented. The retightenable wedge assembly comprises a slot wedge comprising an aperture, a tightening member comprising a form fit feature, and a locking member comprising a mating form fit feature. The tightening member is configured to be tightenable in the aperture for applying a radial load on the coil. The mating form fit feature of the locking member is configured to engage with the form fit feature of the tightening member to lock the tightening member in place in the aperture such that the tightening member is able to be restrained from backing out of the slot wedge.

Various aspects and embodiments of the application as described above and hereinafter may not only be used in the combinations explicitly described, but also in other combinations. Modifications will occur to the skilled person upon reading and understanding of the description.

BRIEF DESCRIPTION OF DRAWINGS

Exemplary embodiments of the application are explained in further detail with respect to the accompanying drawings. In the drawings:

FIGS. 2 to 6 illustrate a schematic perspective view of a retightenable wedge system according to various embodiments of present invention.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
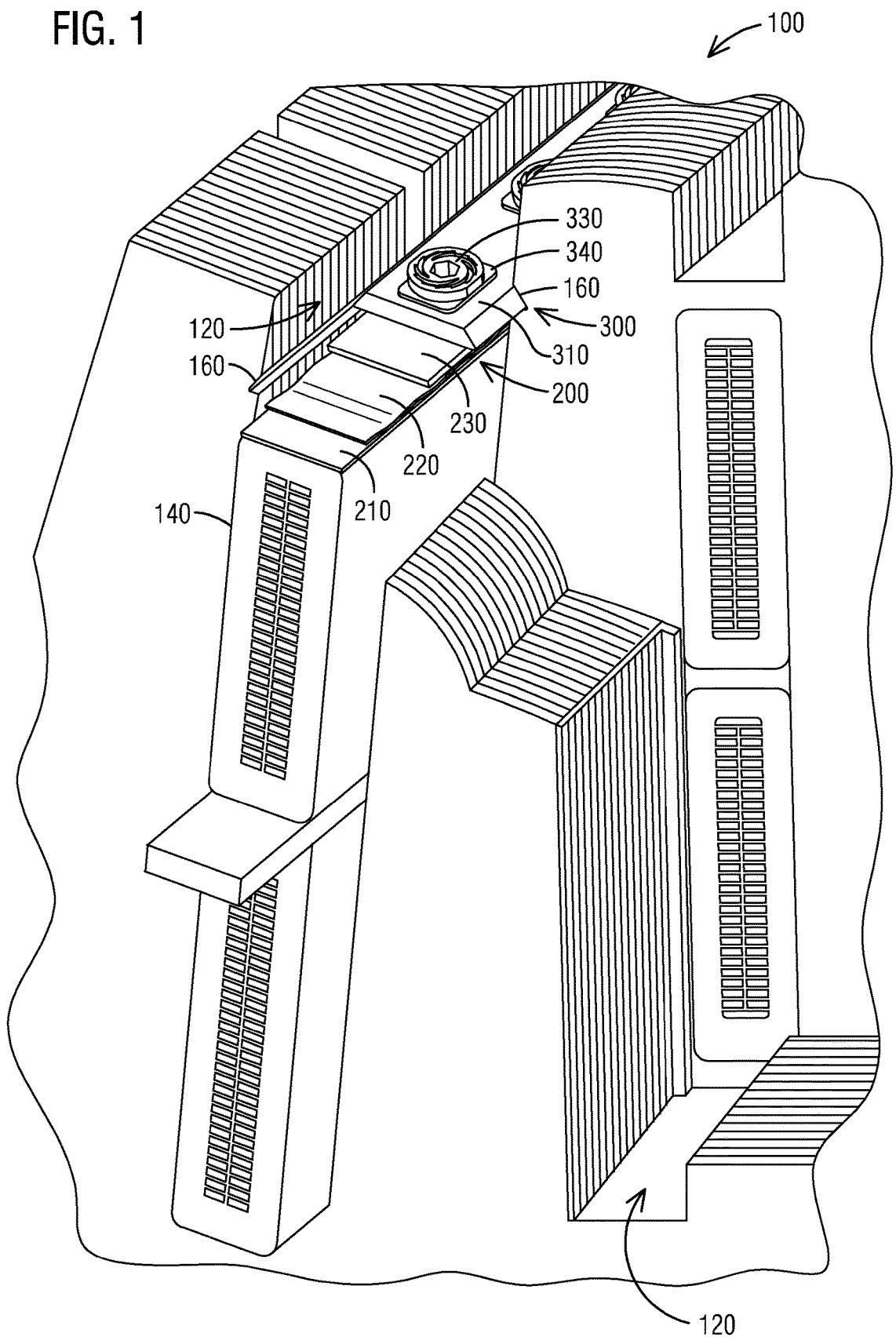
FIG. 1 illustrates a schematic perspective view of a generator stator having a cut away view of a retightenable wedge system according to an embodiment of present invention.

FIG. 1 illustrates a schematic perspective view of a generator stator 100 having a cut away view of a retightenable wedge system 200 according to an embodiment of the present invention. The generator stator 100 may include a plurality of slots 120 may axially extend along a longitudinal direction of the generator stator 100. A plurality of coils 140 may be placed within the slots 120. A plurality of retightenable wedge systems 200 may be placed on the coils 140 engaged with wedge grooves 160 on side walls of the slots 120.

A cut away view of a retightenable wedge system 200 is illustrated in FIG. 1. A retightenable wedge system 200 may include a first filler layer 210 placed on the coil 140. The first filler layer 210 may prevent radial movement of the coil 140 within the slot 120. A spring member 220 may be placed on the first filler layer 210. The spring member 220 may apply a continuous radial load onto the coil 140. The spring member 220 may be referred to as a ripple spring or a pre-stressed driving strip (PSDS). A second filler layer 230 may be placed on the spring member 220. The second filler layer 230 may consist of a similar material of the first filler layer 210. A retightenable wedge assembly 300 may be placed on the second filler layer 230. The retightenable wedge assembly 300 may include a slot wedge 310 engaged with the wedge grooves 160 on side walls of the slots 120. The slot wedge 310 may maintain the second filler layer 230, the spring member 220, the first filler layer 210 and the coil 140 within the slot 120 in a radial direction. The slot wedge 310 may be made of nonmetallic and nonmagnetic composite material, such as polymer reinforced with fiberglass.

The slot wedge 310 may become loose in the wedge grooves 160 over time in generator operation, which may imply a loss of radial loading on the coil 140. The coil 140 may move within the slot 120 if a radial loading on the coil 140 is below a required value. The movement of the coil 140 within the slot 120 may cause damage of the generator stator 100.

According to an embodiment of present invention, the retightenable wedge assembly 300 may include a plurality of tightening members 330. The tightening members 330 may be inserted through apertures 320 (not shown in FIG. 1) of the slot wedge 310. The tightening members 330 may be tightenable in the apertures 320 to establish a radial position below the slot wedge 310, by which a radial load may be imparted onto the second filler layer 230. The second filler layer 230 may evenly distribute the radial load onto the spring member 220. The spring member 220 may apply the evenly distributed radial load onto the coil 140 to prevent movement of the coil 140 within the slot 120. Tightness of the wedge system 200 may be reestablished. The retightenable wedge assembly 300 may include a plurality of locking members 340. The locking members 340 may lock the tightening member 330 in place in the aperture 320 for restraining the tightening members 330 from backing out of the slot wedge 310. Size, number, and spacing of the tightening members 330 may be determined depending on amount of the radial load required for tightening the wedge system 200.

Various embodiments of the retightenable wedge system 200 are described in detail with reference to FIGS. 2 to 6.

FIG. 2 illustrates a schematic perspective view of a retightenable wedge system 200A according to an embodiment of present invention. The retightenable wedge system 200A may include a first filler layer 210, a spring member 220 placed on the first filler layer 210, a second filler layer 230 placed on the spring member 220, and a retightenable wedge assembly 300A placed on the second filler layer 230.

Figure 4:
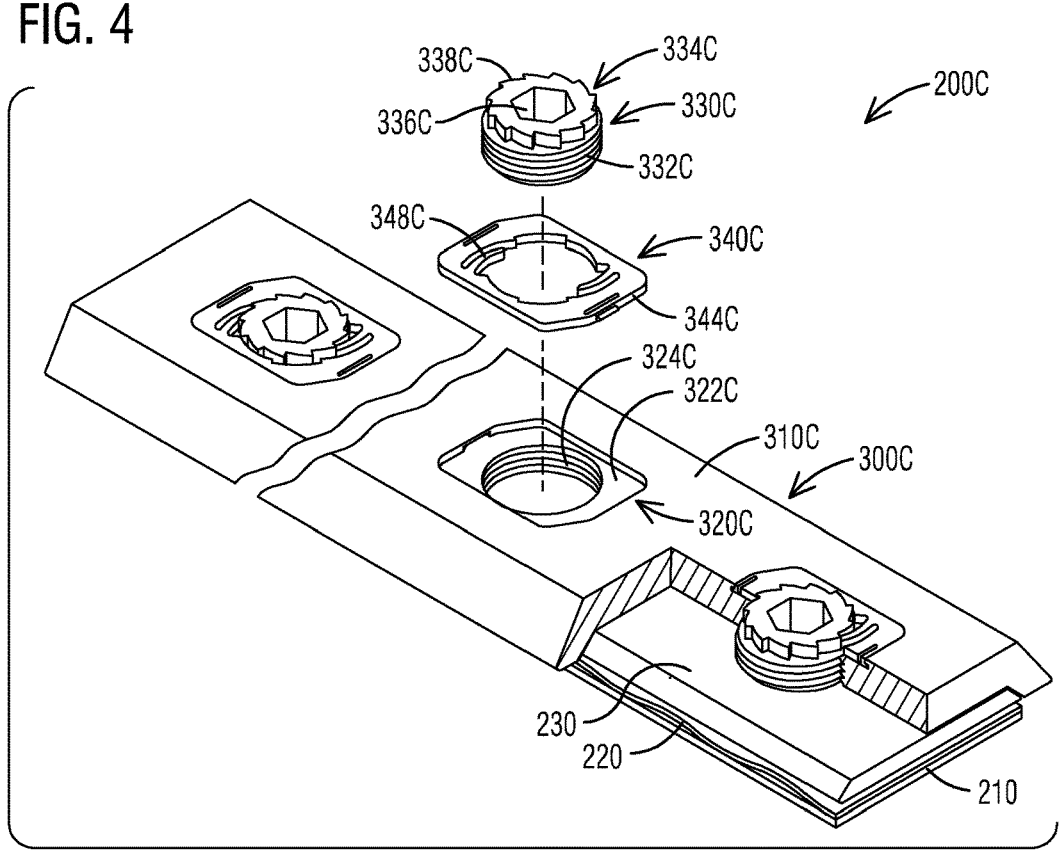
Figure 5:
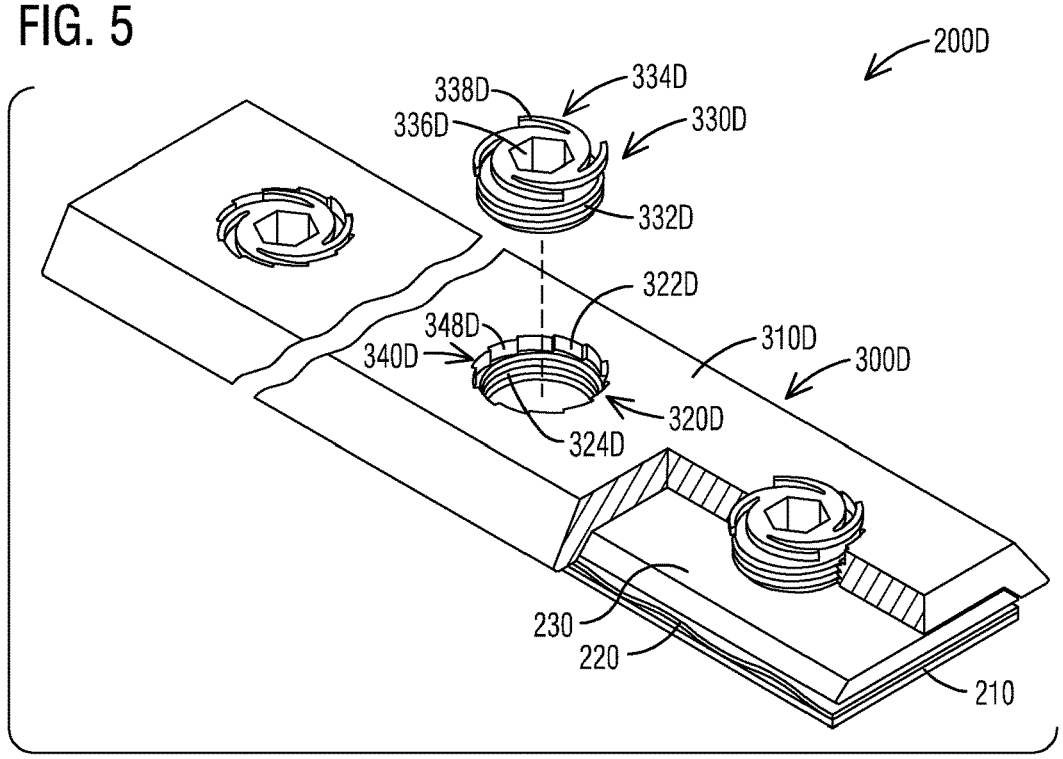
Figure 6:
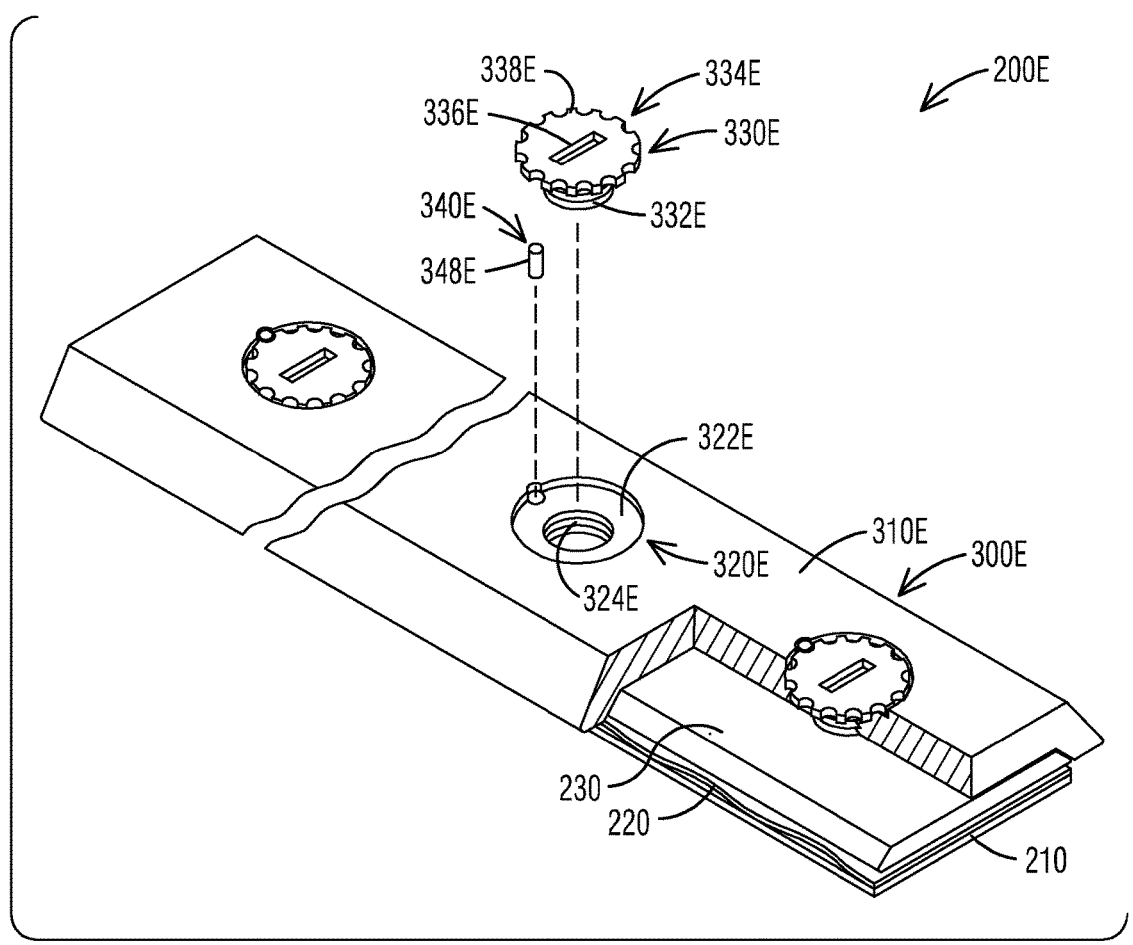

An exploded view and a cut away view of the retightenable wedge assembly 300A are also illustrated in FIG. 2. The retightenable wedge assembly 300A may include a slot wedge 310A. A top surface and a bottom surface of the slot wedge 310A may be flat as illustrated in FIG. 2 and FIG. 3, or may be bended towards to the second filler layer 230 axially along outer edges, as illustrated in FIGS. 4 to 6. The slot wedge 310A may have a plurality of apertures 320A axially spaced apart along a length of the slot wedge 310A. The apertures 320A may be axially regularly spaced apart along a length of the slot wedge 310A. The apertures 320A may be radially perforated through a thickness of the slot wedge 310A. The apertures 320A may be laterally centered cross a width of the slot wedge 310A. The retightenable wedge assembly 300A may include a plurality of tightening members 330A and a plurality of locking members 340A. Each of the tightening members 330A and each of the locking members 340A may be assembled together in each of the apertures 320A.

Each of the apertures 320A may have a top part 322A and a bottom part 324A. Shapes of the top part 322A and the bottom part 324A may be the same as each other, or different from each other. The shape may include, for example, round shape, oval shape, or rectangular shape, etc. Sizes of the top part 322A and the bottom part 324A may be the same as each other, or different from each other. In the exemplary embodiment illustrated in FIG. 2, the top part 322A has a shape having semicircle shapes at two opposite sides connected by two parallel sides. The bottom part 324A has an essentially rectangular shape having round corners. The top part 322A has a smaller cross section compared to a cross section of the bottom part 324A.

Each of the tightening members 330A may have a threaded cylindrical body 332A. For example, the threaded cylindrical body 332A may be a screw. A driving feature 336A may be located on head 334A of the tightening member 330A. A tightening tool (not shown) may be engaged into the driving feature 336A to tighten the tightening member 330A in the aperture 320A until a required radial load is applied on the second filler layer 230. The tightening tool may be, for example, a wrench or a screwdriver. The tightening tool may be manually operated or automatically operated by a robot. The tightening member 330A may include a form fit feature 338A disposed on outer side surface of the head 334A of the tightening member 330A. The form fit feature 338A may include a pawl, a radially extended serrated outer side surface of the head 334A of the tightening member 330A, or any types of form fit features known in the art. In the exemplary embodiment illustrated in FIG. 2, the form fit feature 338A includes at least one pawl disposed on outer side surface of the head 334A of the tightening member 330A.

Each of the locking members 340A may be embedded into each of the apertures 320A from bottom of the slot wedge 310A. Each of the locking members 340A may have a hollow body. Outer side surface of the locking member 340A may include a top part 342A and a bottom part 344A. Shapes and sizes of the top part 342A and the bottom part 344A of the locking member 340A correspond to shapes and sizes of the top part 322A and the bottom part 324A of the apertures 320A respectively. For example, in the exemplary embodiment illustrated in FIG. 2, the top part 342A has a shape having semicircle shapes at two opposite sides connected by two parallel sides. The bottom part 344A has an essentially rectangular shape having round corners. The bottom part 344A has a larger cross section compared to a cross section of the top part 342A. The top part 342A may radially extend out of the aperture 320A. Inner side of the locking member 340A may be shaped to accept the tightening member 330A. Lower portion 346A of inner side surface of the locking member 340A may be threaded to engage with the threaded cylindrical body 332A of the tightening member 330A such that the tightening member 330A is able to be tightened in the aperture 320A for applying a radial load on the second filler layer 230. A mating form fit feature 348A may be disposed on upper portion of the inner side surface of the locking member 340A to engage with the form fit feature 338A of the tightening member 330A to lock the tightening member 330A in place in the aperture 320A such that the tightening member 320A may be restrained from backing out of the slot wedge 310A. The mating form fit feature 348A may include a pawl, a radially extended serrated inner side surface, or any types of form fit features known in the art. In the exemplary embodiment illustrated in FIG. 2, the mating form fit feature 348A is a radially extended serrated inner side surface of the locking member 340A. Configurations of the aperture 320A, the tightening member 330A and the locking member 340A may be engaged with each other to provide optimal outcome when tightening the retightenable wedge system 200A.

FIG. 3 illustrates a schematic perspective view of a retightenable wedge system 200B according to an embodiment of present invention. An exploded view and a cut away view of a retightenable wedge assembly 300B are also illustrated in FIG. 3. Corresponding parts of FIG. 3 are correspondingly numbered, but are not described again with reference to FIG. 3.

In this exemplary embodiment, a top part 322B of an aperture 320B has a larger cross section compared to a cross section of a bottom part 324B of the aperture 320B. Surface of the bottom part 324B of the aperture 320B is threaded. The top part 322B of the aperture 320B may have a shape such as, round shape, oval shape, or rectangular shape, etc. In the exemplary embodiment illustrated in FIG. 3, the top part 322B has an essentially rectangular shape having round corners.

A tightening member 330B may have a threaded cylindrical body 332B. The threaded cylindrical body 332B may engage with the threaded surface 324B of the aperture 320B such that the tightening member 330B is able to be tightened in the aperture 320B for applying a radial load on a second filler layer 230. A form fit feature 338B is disposed on outer side surface of head 334B of the tightening member 330B. The form fit feature 338B may include a pawl, a radially extended serrated outer side surface of the head 334B of the tightening member 330B, or any types of form fit features known in the art. In the exemplary embodiment illustrated in FIG. 3, the form fit feature 338B includes at least one pawl disposed on outer side surface of the head 334B of the tightening member 330B.

A locking member 340B may be embedded into the aperture 320B from top of a slot wedge 310B. The locking member 340B has a hollow body. Outer side surface of bottom part 344B of the locking member 340B may be embedded into the top part 322B of the aperture 320B from top of the slot wedge 310B. Shape and size of the bottom part 344B may correspond to the shape and size of the top part 322B of the aperture 320B. Outer side surface of top part 342B of the locking member 340B may have the same shape as or different shape from the bottom part 344B of the locking member 340B. The top part 342B of the locking member 340B may radially extend out of the aperture 320B. The top part 342B may have a shape such as, round shape, oval shape, or rectangular shape, etc. In the exemplary embodiment illustrated in FIG. 3, the top part 342B has a shape having semicircle shapes at two opposite sides connected by two parallel sides. A mating form fit feature 348B may be disposed on inner side surface of the locking member 340B to engage with the form fit feature 338B of the tightening member 330B to lock the tightening member 330B in place in the aperture 320B such that the tightening member 320B may be restrained from backing out of the slot wedge 310B. The mating form fit feature 348B may include a pawl, a radially extended serrated inner side surface, or any types of form fit features known in the art. In the exemplary embodiment illustrated in FIG. 3, the mating form fit feature 348B is a radially extended serrated inner side surface of the locking member 340B. Configurations of the aperture 320B, the tightening member 330B and the locking member 340B may be engaged with each other to provide optimal outcome when tightening the retightenable wedge system 200B.

FIG. 4 illustrates a schematic perspective view of a retightenable wedge system 200C according to an embodiment of present invention. An exploded view and a cut away view of a retightenable wedge assembly 300C are also illustrated in FIG. 4. Corresponding parts of FIG. 4 are correspondingly numbered, but are not described again with reference to FIG. 4.

In this exemplary embodiment, a top part 322C of an aperture 320C has a larger cross section compared to a cross section of a bottom part 324C of the aperture 320C. The top part 322C may have a shape such as, round shape, oval shape, or rectangular shape, etc. In the exemplary embodiment illustrated in FIG. 4, the top part 322C has an essentially rectangular shape. Surface of the bottom part 324C of the aperture 320C is threaded.

A tightening member 330C has a threaded cylindrical body 332C. The threaded cylindrical body 332C may engage with the threaded surface 324C of the aperture 320C such that the tightening member 330C is able to be tightened in the aperture 320C for applying a radial load on a second filler layer 230. A form fit feature 338C of the tightening member 330C may be disposed on outer side surface of head 334C of the tightening member 330C. The form fit feature 338C may include a pawl, a radially extended serrated outer side surface of the head 334C of the tightening member 330C, or any types of form fit features known in the art. In the exemplary embodiment illustrated in FIG. 4, the form fit feature 338C is a radially extended serrated outer side surface of the head 334C of the tightening member 330C.

A locking member 340C is embedded into the aperture 320C from top of a slot wedge 310C. The locking member 340C has a hollow body. Outer side surface 344C of the locking member 340C may be embedded into the top part 322C of the aperture 320C from top of the slot wedge 310C. Shape and size of the outer side surface 344C may correspond to the shape and size of the top part 322C of the aperture 320C. A mating form fit feature 348C of the locking member 340C may be disposed on inner side surface of the locking member 340C to engage with the form fit feature 338C of the tightening member 330C to lock the tightening member 330C in place in the aperture 320C such that the tightening member 330C may be restrained from backing out of the slot wedge 310C. The mating form fit feature 348C may include a pawl, a radially extended serrated inner side surface, or any types of form fit features known in the art. In the exemplary embodiment illustrated in FIG. 4, the mating form fit feature 348C is at least a pawl disposed on inner side surface of the locking member 340C. Configurations of the aperture 320C, the tightening member 330C and the locking member 340C may be engaged with each other to provide optimal outcome when tightening the retightenable wedge system 200C.

FIG. 5 illustrates a schematic perspective view of a retightenable wedge system 200D according to an embodiment of present invention. An exploded view and a cut away view of a retightenable wedge assembly 300D are also illustrated in FIG. 5. Corresponding parts of FIG. 5 are correspondingly numbered, but are not described again with reference to FIG. 5.

In this exemplary embodiment, surface of a bottom part 324D of an aperture 320D is threaded. A tightening member 330D has a threaded cylindrical body 332D. The threaded cylindrical body 332D may engage with the threaded surface 324D of the aperture 320D such that the tightening member 330D is able to be tightened in the aperture 320D for applying a radial load on a second filler layer 230. A form fit feature 338D of a tightening member 330D may be disposed on outer side surface of head 334D of the tightening member 330D. A form fit feature 338D may a pawl, a radially extended serrated outer side surface of the head 334D of the tightening member 330D, or any types of form fit feature known in the art. In the exemplary embodiment illustrated in FIG. 5, the form fit feature 338D includes at least one pawl disposed on outer side surface of the head 334D of the tightening member 330D.

A locking member 340D may be an integral part of an aperture 320D. For example, the locking member 340D may have a mating form fit feature 348D, such as a pawl, or a radially extended serrated surface of the aperture 320D, or any types of form fit feature known in the art, disposed on top part of the aperture 320D. In the exemplary embodiment illustrated in FIG. 5, the mating form fit feature 348D is a radially extended serrated surface of the aperture 320D disposed on top part 322D of the aperture 320D. The mating form fit feature 348D of the locking member 340D may engage with the form fit feature 338D of the tightening member 330D to lock the tightening members 330D in place in the aperture 320D such that the tightening member 330D may be restrained from backing out of the slot wedge 310D. Configurations of the aperture 320D, the tightening member 330D and the locking member 340D may be engaged with each other to provide optimal outcome when tightening the retightenable wedge system 200D.

FIG. 6 illustrates a schematic perspective view of a retightenable wedge system 200E according to an embodiment of present invention. An exploded view and a cut away view of a retightenable wedge assembly 300E are also illustrated in FIG. 6. Corresponding parts of FIG. 6 are correspondingly numbered, but are not described again with reference to FIG. 6.

In this embodiment, a top part 322E of an aperture 320E has a larger cross section compared to a cross section of a bottom part 324E of the aperture 320E. The top part 322E may have a shape such as, round shape, oval shape, or rectangular shape, etc. In the exemplary embodiment illustrated in FIG. 6, the top part 322E has a round shape. Surface of the bottom part 324E is threaded to engage with a threaded cylindrical body 332E of a tightening member 330E such that the tightening member 330E is able to be tightened in the aperture 320E for applying a radial load on a second filler layer 230. Head 334E of the tightening member 330E may be embedded into the top part 322E of the aperture 320E. Shape and size of the head 334E may correspond to shape and size of the top part 322E of the aperture 320E. A form fit feature 338E of the tightening member 330E may be disposed on outer side surface of the head 334E. A locking member 340E may be embedded into the aperture from top of a slot wedge 310E. A mating form fit feature 348E of the locking member 340E may engage with the form fit feature 338E of the tightening member 330E to lock the tightening member 330E in place in the aperture 320E such that the tightening member 330E may be restrained from backing out of a slot wedge 310E. In the exemplary embodiment illustrated in FIG. 6, the form fit feature 338E is a radially extended serrated outer side surface of the head 334E. The mating form fit feature 348E is a locking pin. At least one locking pin 348E may be bonded into the aperture 320E through the serrated head 334E of the tightening member 330E. A plurality of looking pins 348E may be required for locking each tightening member 330E depending on amount of required radial load. Configurations of the aperture 320E, the tightening member 330E and the locking member 340E may be engaged with each other to provide optimal outcome when tightening the retightenable wedge system 200E.

In power plant operation, tightness inspection of wedges may be periodically performed, such as during maintenance or at power plant outages. Conventionally a full or partial re-wedging may be required if the wedges are loosen. A conventionally re-wedging process may require repetitively axially driving the wedges. The process may also require removal of rotor. The process may need exhausting effort and time and material. According to an aspect, the proposed retightenable wedge system 200 may be easily radially tightened from top of a slot wedge 310, thus eliminate the conventionally exhausting repetitive effort for axially driving wedges over slot 120. The proposed retightenable wedge system 200 may include a retightenable wedge assembly 300 having a tightening member 330 and a locking member 340. The locking member 340 may lock the tightening member 330 in place for restraining the tightening members 330 from backing out of a slot wedge 310.

According to an aspect, the proposed retightenable wedge system 200 may allow to tighten the wedge system 200 with ease at first installation and during either a maintenance or outage of a generator. The proposed retightenable wedge system 200 may tighten the coil 140 in a single step. The proposed retightenable wedge system 200 may not require removing rotor for tightening the coil 140 in the slot 120. The proposed retightenable wedge system 200 may be manually tightened or automatically tightened by using robotic power tools. The proposed retightenable wedge system 200 provides a simple and efficient way for tightening the coil 140 in the slot 120. The proposed retightenable wedge system 200 reduces man power and provides cost savings for generator installation and maintenance.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Generator Stator
120: Slot
140: Coil
160: Wedge Groove
200: Retightenable Wedge System
210: First Filler Layer
220: Spring Member
230: Second Filler Layer
300: Retightenable Wedge Assembly 310: Slot Wedge
320: Aperture of Slot Wedge
322: Top Part of Aperture
324: Bottom Part of Aperture
330: Tightening Member
332: Threaded Cylindrical Body of Tightening Member
334: Head of Tightening Member
336: Driving Feature of Tightening Member
338: Form Fit Feature of Tightening Member
340: Locking Member
342: Top Part of Outer Side Surface of Locking Member
344: Bottom Part of Outer Side Surface of Locking Member
346: Lower Portion of Inner Side Surface of Locking Member
348: Mating Form Fit Feature of Locking Member

What is claimed is:

1. A retightenable wedge system for tightening a coil in a slot of a generator stator comprising:
   a first filler layer placed on the coil;
   a spring member placed on the first filler layer;
   a second filler layer placed on the spring member;
   a retightenable wedge assembly placed on the second filler layer, wherein the retightenable wedge assembly comprises:
      a slot wedge comprising an aperture;
      a tightening member comprising a form fit feature, wherein the tightening member is configured to be tightenable in the aperture for applying a radial load on the second filler layer, wherein the second filler layer is configured to evenly distribute the radial load on the spring member, and wherein the spring member is configured to apply the evenly distributed radial load onto the coil for tightening the coil in the slot; and
      a locking member comprising a mating form fit feature configured to engage with the form fit feature of the tightening member to lock the tightening member in place in the aperture such that the tightening member is able to be restrained from backing out of the slot wedge.

2. The retightenable wedge system as claimed in claim 1, wherein the form fit feature of the tightening member comprises a pawl located on outer side surface of head of the tightening member.

3. The retightenable wedge system as claimed in claim 1, wherein the form fit feature of the tightening member comprises a radially extended serrated outer side surface of head of the tightening member.

4. The retightenable wedge system as claimed in claim 1, wherein the mating form fit feature of the locking member comprises a radially extended serrated inner side surface of the locking member.

5. The retightenable wedge system as claimed in claim 1, wherein the mating form fit feature of the locking member comprises a pawl located on inner side surface of the locking member.

6. The retightenable wedge system as claimed in claim 1, wherein the mating form fit feature of the locking member comprises a locking pin.

7. The retightenable wedge system as claimed in claim 1, wherein the locking member is embedded in the aperture.

8. The retightenable wedge system as claimed in claim 1, wherein the locking member is an integral part of the aperture.

9. A method for tightening a coil in a slot of a generator stator comprising:
   placing a first filler layer on the coil;
   placing a spring member on the first filler layer;
   placing a second filler layer on the spring member;
   placing a retightenable wedge assembly on the second filler layer, wherein the retightenable wedge assembly comprises:
      a slot wedge comprising an aperture,
      a tightening member comprising a form fit feature, and
      a locking member comprising a mating form fit feature,
   tightening the tightening member in the aperture for applying a radial load on the second filler layer, wherein the second filler layer is configured to evenly distribute the radial load on the spring member, and wherein the spring member is configured to apply the evenly distributed radial load onto the coil for tightening the coil in the slot; and
   locking the tightening member in place in the aperture by an engagement between the form fit feature of the tightening member and the mating form fit feature of the locking member such that the tightening member is able to be restrained from backing out of the slot wedge.

* * * * *